US012748629B2

(12) United States Patent
Rieber

(10) Patent No.: US 12,748,629 B2
(45) Date of Patent: Sep. 29, 2026

(54) DEVICE AND METHOD TO GENERATE INSTRUCTIONS FOR A COMPUTING DEVICE FOR EXECUTING A COMPUTATIONAL ALGORITHM

(71) Applicant: Robert Bosch GmbH, Stuttgart (DE)

(72) Inventor: Dennis Sebastian Rieber, Albstadt (DE)

(73) Assignee: Robert Bosch GmbH, Stuttgart (DE)

( * ) Notice: Subject to any disclaimer, the term of this patent is extended or adjusted under 35 U.S.C. 154(b) by 914 days.

(21) Appl. No.: 17/920,862

(22) PCT Filed: Apr. 14, 2021

(86) PCT No.: PCT/EP2021/059682
§ 371 (c)(1),
(2) Date: Oct. 24, 2022

(87) PCT Pub. No.: WO2021/228483
PCT Pub. Date: Nov. 18, 2021

(65) Prior Publication Data

US 2023/0244745 A1 Aug. 3, 2023

(30) Foreign Application Priority Data

May 14, 2020 (DE) ..................... 10 2020 206 112.2

(51) Int. Cl.
*G06F 9/50* (2006.01)
*G06F 17/11* (2006.01)
(Continued)

(52) U.S. Cl.
CPC ............ *G06F 9/5038* (2013.01); *G06F 17/11* (2013.01); *G06F 18/10* (2023.01); *G06V 10/757* (2022.01)

(58) Field of Classification Search
CPC ........ G06F 17/11; G06F 18/10; G06F 9/5038; G06V 10/757
See application file for complete search history.

(56) References Cited

U.S. PATENT DOCUMENTS

| | | | |
|---|---|---|---|
| 8,549,529 B1 | 10/2013 | Schildan et al. | |
| 2005/0257194 A1 | 11/2005 | Morrow et al. | |

(Continued)

FOREIGN PATENT DOCUMENTS

| | | | | |
|---|---|---|---|---|
| CN | 106547620 A | | 3/2017 | |
| CN | 108292241 A | * | 7/2018 | ........... G06F 9/5066 |

(Continued)

OTHER PUBLICATIONS

Chen et al.,"TVM: An Automated End-to-End Optimizing Compiler for Deep Learning" arXiv (2018) pp. 1-16.

(Continued)

*Primary Examiner* — Phillip H Nguyen
(74) *Attorney, Agent, or Firm* — Norton Rose Fulbright US LLP

(57) ABSTRACT

A computer-implemented method to generate instructions for a computing device. A first graph having nodes and edges is provided, which defines first instructions for the computing device. At least one first part is sought in the first graph. A second part is determined as a function of the at least one first part. A directed, acyclic, linked second graph having nodes and edges is determined as a function of the first graph. In the second graph, the first part is replaced by the second part. The second graph defines second instructions for the computing device for executing the computational algorithm. A pattern for at least a part of a graph is provided, whose nodes and edges are defined by instructions that are executable by the computing device. The first graph or the
(Continued)

second graph is selected as a function of the pattern, to generate instructions for the computing device.

17 Claims, 9 Drawing Sheets

(51) Int. Cl.

| | |
|---|---|
| ***G06F 18/10*** | (2023.01) |
| ***G06V 10/75*** | (2022.01) |

(56) References Cited

U.S. PATENT DOCUMENTS

| | | | | |
|---|---|---|---|---|
| 2011/0225570 | A1* | 9/2011 | Stanford-Jason | G06F 11/3604 717/140 |
| 2020/0167787 | A1* | 5/2020 | Kursun | H04L 67/306 |

FOREIGN PATENT DOCUMENTS

| | | | | | |
|---|---|---|---|---|---|
| CN | 108351983 | A | * | 7/2018 | G06F 9/5066 |
| CN | 108541315 | A | | 9/2018 | |
| CN | 108604182 | A | | 9/2018 | |
| CN | 110377340 | B | * | 6/2021 | G06F 9/3836 |
| DE | 202018100069 | U1 | * | 4/2018 | G06N 3/105 |
| KR | 20180073669 | A | * | 7/2018 | G06N 3/084 |

OTHER PUBLICATIONS

Sotoudeh et al., "ISA Mapper: A Compute and Hardware Agnostic Deep Learning Compiler" Proceeding of the 16th Conference on Computer Frontiers (2019) pp. 164-173.

Aho et al. "Efficient String Matching: An Aid to Bibliographic Search", Association for Computing Machinery Inc. (1975) pp. 333-340.

Hoffman et al., "Pattern Matching in Trees", Journal of the Association for Computing Machinery 29, 1 (1982) pp. 68-95.

InternationaL Search Report for PCT/EP20211059682, Issued Jul. 19, 2021.

Braun, et al.: "Firm—A Graph-Based Intermediate Representation," Karlsruhe Reports in Informatics, 35 (2011), pp. 1-10, ISSN 2190-4785.

Click and Paleczny: "A Simple Graph-Based Intermediate Representation," ACM Sigplan Notices, 30(3), (1995), pp. 35-49; DOI 10.1145/202530.202534.

* cited by examiner

DEVICE AND METHOD TO GENERATE INSTRUCTIONS FOR A COMPUTING DEVICE FOR EXECUTING A COMPUTATIONAL ALGORITHM

FIELD

The present invention relates to a device and a method to generate instructions for a computing device for executing a computational algorithm.

BACKGROUND INFORMATION

Tianqi Chen, Thierry Moreau, Ziheng Jiang, Haichen Shen, Eddie Q. Yan, Leyuan Wang, Yuwei Hu, Luis Ceze, Carlos Guestrin, and Arvind Krishnamurthy; 2018, "TVM: End-to-End Optimization Stack for Deep Learning;" CoRR abs/1802.04799 (2018), arXiv:1802.04799, http://arxiv.org/abs/1802.04799, describes a tool referred to as a TVM, for selecting instructions for electronic circuits, which are manufactured for special mathematical computations. These are referred to as accelerators or hardware accelerators and are used, for example, for computations in artificial neural networks.

M. Sotoudeh, A. Venkat, M. Anderson, E. Georganas, A. Heinecke, J. Knigh; "ISA Mapper: A Compute and Hardware Agnostic Deep Learning Compiler;" https://dl.acm.org/doi/10.1145/3310273.3321559, describes an option of working with loop nests during the generation of instructions.

It is desirable to provide an efficient procedure for generating instructions for any such hardware accelerators and any computational algorithms.

SUMMARY

This may be achieved by the subject matter of the present invention.

According to an example embodiment of the present invention, a computer-implemented method to generate instructions for a computing device for execution of a computational algorithm provides that a directed, first graph having nodes and edges be made available, which defines first instructions for the computing device for executing the computational algorithm; at least one first part having a first structure being sought in the first graph; a second part having a second structure being determined as a function of the at least one first part; a directed, second graph having nodes and edges being determined as a function of the first graph; in the second graph, the first part being replaced by the second part; the second graph defining second instructions for the computing device for executing the computational algorithm; a pattern for at least a part of a graph being provided, whose nodes and edges are defined by instructions that are executable by the computing device; the instructions for the computing device being generated either as a function of the first graph or as a function of the second graph; and the first graph or the second graph being selected for generating instructions for the computing device as a function of the pattern. The first graph may be a directed, acyclic, linked graph. Subgraphs, which correspond to a search pattern, are found in the first graph. New subgraphs that define instructions, by which the same partial result is completely determinable, are generated for these subgraphs. A second graph is generated, using the new subgraphs. Different computing devices may determine different partial results at different rates or levels of precision, using different, specialized hardware. One of the graphs, by which the instructions are generated, is selected for certain hardware. The pattern determines the instructions, which match the specific hardware particularly effectively. In this manner, the instructions particularly well-suited to this hardware may be generated. Data dependencies, which are taken into account in the selection of the graph, may be represented by the directed edges.

The nodes may define operations or operands for executing the computational algorithm; the edges defining an order of performing operations for executing the computational algorithm.

According to an example embodiment of the present invention, depending on the computational algorithm, a graph may be provided, which includes a node that defines an iterator for an operation to execute the computational algorithm; a length of a path in the graph between a node, which uses the iterator, and the node, which defines the iterator, being determined; in the node, which uses the iterator, a reference to the node, which defines the iterator, being replaced by an information item, which includes the length of the path; and the directed, first graph being determined as a function of the node, which includes the length of the path. Due to this, instead of a reference to a node, which defines a program loop in the graph or for a reduction in dimensions, the length of the path is defined. Starting out from the node, which defines the iterator, the node, which uses the iterator, is reachable in the first graph, in that a parent node for a child node is determined until the length of the path is arrived at.

The first structure may define a first subgraph, which includes a plurality of nodes and edges that define at least one operation for at least two operands in a first order; the second structure defining a second subgraph, which is defined by the nodes of the first subgraph; the edges of the second subgraph defining at least one operation for the at least two operands in a second order; the at least one operation defining an element-by-element operation.

The first structure may be defined by a first character string, which defines a path in the first graph; the second structure being defined by a second character string, which defines a path in the second graph. Due to this, pattern matching may be carried out via character-string comparisons.

The first character string and/or the second character string may include an ordered list of designations for nodes in the path, which defines the node. In this manner, nodes may be found particularly effectively in the character-string comparison.

The first structure may define a first subgraph, which includes a plurality of nodes and edges that define a first array in a storage device of the computing device for at least two dimensions of an operand; the second structure defining a second subgraph, which is defined by the nodes of the first subgraph; the edges of the second subgraph defining a second array in the storage device, for the at least two dimensions of the operand.

The first array may define a first tensor for data; the second array defining a second tensor for the data; the second tensor being defined by the transposed, first tensor.

The first array may have more dimensions than the second array; the second array being determined by linearizing a plurality of dimensions of the first array. The first array may have fewer dimensions than the second array; the second array being determined by replicating at least one dimension of a plurality of dimensions of the first array, or by adding a dimension filled in with at least one value, in particular, with at least one zero.

The data may be defined by an input for the computational algorithm or by a partial result of the computational algorithm.

The first structure may define a first subgraph, which includes a first node at which no edge begins; the first node defining a first storage area for the computing device in at least two dimensions; the first structure including a second node, which defines an operation for values in the first storage area; a second storage area for the computing device being defined in at least one of the dimensions of the first storage area; the second structure defining a second subgraph, in which the first node of the first subgraph is replaced by a third node, which defines the second storage area; for at least one dimension of the first storage area, which is missing in the second storage area, the second structure defining a program loop, which defines a repeated execution of the operation with the second operand over this dimension.

According to an example embodiment of the present invention, a plurality of first structures may be provided; a plurality of second graphs being determined for first structures, which are found in the first graph; the plurality of first structures being sought in the plurality of second graphs. The search is repeated iteratively, until no further subgraph corresponding to the search pattern is found.

According to an example embodiment of the present invention, executable instructions may be specified, determined, or received by the computing device; the pattern being determined as a function of the executable instructions.

According to an example embodiment of the present invention, a data structure for a node of the first graph is preferably determined from a plurality of data structures for nodes of the first graph; the data structure including a data field, which defines an operation that is to be performed on other nodes; a data structure being determined for a node of the second graph having the same data structure; a data field that defines a node, on which the operation is to be performed, being replaced by a data field, in which another node is defined, on which the operation is to be performed; either the other node being defined in another data field of the data structure for the node; or the other node being defined in a data field of a data structure of a further node, to which a data field from the data structure of the node of the first graph refers. In this manner, an order of the instructions for a computation is reversed.

According to an example embodiment of the present invention, a data structure for a node of the first graph is preferably determined from a plurality of data structures for nodes of the first graph; the data structure including a data field, which defines a list including other nodes; a data structure being determined for a node of the second graph having the same data structure; the data field, which defines the list, being replaced by a data field, in which a first entry from the list and a second entry from the list are interchanged. Due to this, instead of a vector, a tensor, or a matrix, its transpose is acted upon at an input node.

According to an example embodiment of the present invention, at least one node is preferably determined, which defines a program loop for determining a result; the node being assigned a parameter, which characterizes a storage frame in the storage device; a first program loop and a second program loop being determined as a function of the parameter; the first program loop including at least one instruction for determining the result and one instruction for calling up the second program loop, by which a partial result for it may be determined. This allows segmentation of the program loops, if the instructions are smaller than the dimensions of the computational algorithm.

According to an example embodiment of the present invention, a device to generate instructions for a computing device for executing a computational algorithm is configured to carry out the method.

According to an example embodiment of the present invention, a data structure to generate instructions for a computing device for executing a computational algorithm includes, for a node of a graph: a first data field for a parent node of the node in the graph, at least one second data field for a child node of the node in the graph, and at least one third data field, which characterizes an operation or an operand of the computational algorithm.

The at least one third data field may define a data user, a magnitude of at least one dimension for the computation, an arithmetic operation, a dependency or order for the computation, or a value type.

Further advantageous specific embodiments of the present invention are derived from the following description and the figures.

DETAILED DESCRIPTION OF EXAMPLE EMBODIMENTS

In the following, G:=(V, A, s, t) denotes a directed multigraph, that is, a graph having a plurality of directed edges, which are individually identifiable.

V denotes a number of nodes, A denotes a number of edges, s denotes a function that assigns each edge the node, at which the edge begins, and t denotes a function that assigns each edge the node, at which the edge ends.

A tree refers to a graph, which defines exactly one path between two nodes. In the example, a path denotes a finite sequence of edges, which connects, in the example, a finite number of nodes that are all different from each other.

A representation, which is based on a graph and determines a computational sequence and computational hierarchy, as well as storage-device access patterns for both a kernel and an instruction set architecture, is referred to in the following as an intermediate representation. The instruction set architecture may be an x86 instruction set architecture, that is, an instruction set architecture (ISA) for an x86 CPU.

In the example, the intermediate representation is a multigraph, which represents the computations in operators of an artificial neural network.

Figure 1:
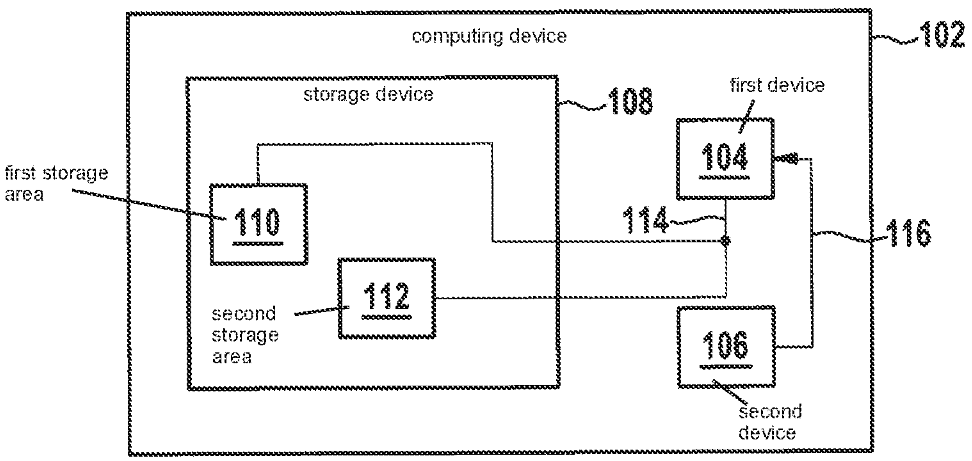
FIG. 1 shows a device to generate instructions for a computing device, according to an example embodiment of the present invention.

A device to generate instructions for a computing device 102 for executing a computational algorithm is represented schematically in FIG. 1.

Computing device 102 includes a first device 104, a second device 106, and a storage device 108.

In the example, first device 104 includes electrical circuits, which are configured to execute certain, specified instructions. First device 104 is designed to have read access to storage device 108. First device 104 is designed to have write access to storage device 108. In response to each instance of executing a certain, specified instruction, first device 104 is configured to determine the same output as a function of the same input. In the example, the input is defined by values from a first storage area 110 of storage device 108. In the example, the output is defined by values from a second storage area 112 of storage device 108. In the example, second storage area 112 of storage device 108 is undefined during the execution of an instruction. In the example, second storage area 112 is only used or changed after the execution of this instruction. A first data line 114 may connect them.

In the following, first device 104 is referred to as a hardware accelerator.

Second device 106 is configured to determine instructions for the hardware accelerator as a function of a computational algorithm. A second data line 116 may connect these. Second device 106 may be configured to detect a type of hardware accelerator. Second device 106 may be configured to determine the type of hardware accelerator from a configuration inputted by a user. Second device 106 may be configured to ascertain the type of hardware accelerator by an interrogation of the hardware accelerator, and to detect the type as a function of a response of the hardware accelerator. In this case, the hardware accelerator may be configured to transmit this response upon receipt of the inquiry. The hardware accelerator may also transmit the type without receiving an inquiry, e.g., when the hardware accelerator is switched on.

Second device 106 may be configured to execute the method described below. This method may also be executed outside of second device 106 or outside of computing device 102; a result of the method determining the instructions, which second device 106 is intended to generate, in order to drive the hardware accelerator to determine the result of a computation in accordance with the computational algorithm or to determine a partial result from it.

In the example, storage device 108 has a linear address space. Scalars or tensors may be stored in the address space. In the example, a one-dimensional tensor is assigned a linked storage area in the address space; individual elements of the tensor, that is, the storage location of individual values of these elements, being addressable in a first dimension i. In the example, a specified number of storage cells is determined for a value. In the example, a value of an element of a tensor stored in storage device 108 is stored in the storage cells, which begin, starting from a starting address for the tensor in the storage area for the tensor, in the digit position defined by a position of the element in the tensor in first dimension i.

First dimension i and a second dimension j may be defined for a two-dimensional tensor. In the example, the storage location of individual values is determined in each of the dimensions of the tensor, as for the one-dimensional tensor.

The hardware accelerator may have unchangeable electrical circuits for processing one of the operations from the following non-exhaustive list for one-dimensional and/or multidimensional tensors:

Element-by-element operation, e.g., addition, multiplication, division, subtraction, scalar product;

tensor reduction, e.g., vector reduction

For the operations, an unchangeable, first range of values may be defined for first dimension i. For the operations, an unchangeable, second range of values may be defined for second dimension j. The first range of values and/or the second range of values may be determined by the layout or the configuration of the unchangeable electrical circuits.

An instruction or instructions for computing such an operation may be represented by patterns that are discoverable in a structure of a graph, which defines a computational algorithm in which one of the operations may be used.

The method described below allows a graph to be selected, which allows the instruction or instructions to be generated, by which a result of a computation may be calculated according to the computational algorithm, using the hardware accelerator. The instruction or instructions may include loading an operand, for example, a vector, a tensor, or a matrix, into first storage area 110. The instruction or instructions may include fetching a result or a partial result of the computation according to the computational algorithm, for example, a vector, a tensor, or a matrix, out of second storage area 112. The instruction or instructions may include an order for the writing, the computing, and/or the reading. The instruction or instructions may include an order for setting up a vector, a tensor, or a matrix in storage device 108. For example, an instruction may provide for a reordering of storage locations or their addressing in the storage device 108 for values; the reordering defining a transpose of a vector, a tensor, or a matrix in storage device 108.

In the example, a computational algorithm is represented by a graph for the intermediate representation. In the intermediate representation, nodes have a parent node and one or more child nodes. The nodes may include one of the following types:

Tensor Node:

A tensor node defines the tensor dimension and a set-up of a program loop for repeated performance of at least one operation over a dimension for a tensor. The tensor node may determine, for example, a repeated computation in first dimension i or second dimension j.

Reduction Node:

For an input having a plurality of dimensions, a reduction node defines an operation, which results in a reduction in the dimensions. This means that the reduction node defines a computation, whose output has fewer dimensions than its input. A reduction node is assigned a particular arithmetic operation.

An example of such a computation is a summation, for example, an addition of all elements of a vector at the input, by which a scalar is determined at the output.

Computation Node:

A computation node defines an element-by-element function. The element-by-element function may designate an unchangeable order for its inputs. This is provided, for example, for a subtraction. The element-by-element function may designate a changeable order for its inputs. This is provided, for example, in commutative operations, such as addition.

Input Node:

An input node defines an input for the computation. For example, the input node defines a scalar, a vector, a tensor, or a matrix.

Access Node:

An access node defines a storage device access function, by which a scalar or a dimension of a vector, a tensor, or a matrix is accessed.

No edges of the graph have to start from the access node.

Access nodes may be connected to further access nodes. Consequently, more complex storage device access functions may be reproduced, such as addition of two iterators or indices i+j. An addition operation may also be reproduced by an access-type node.

Figure 2:
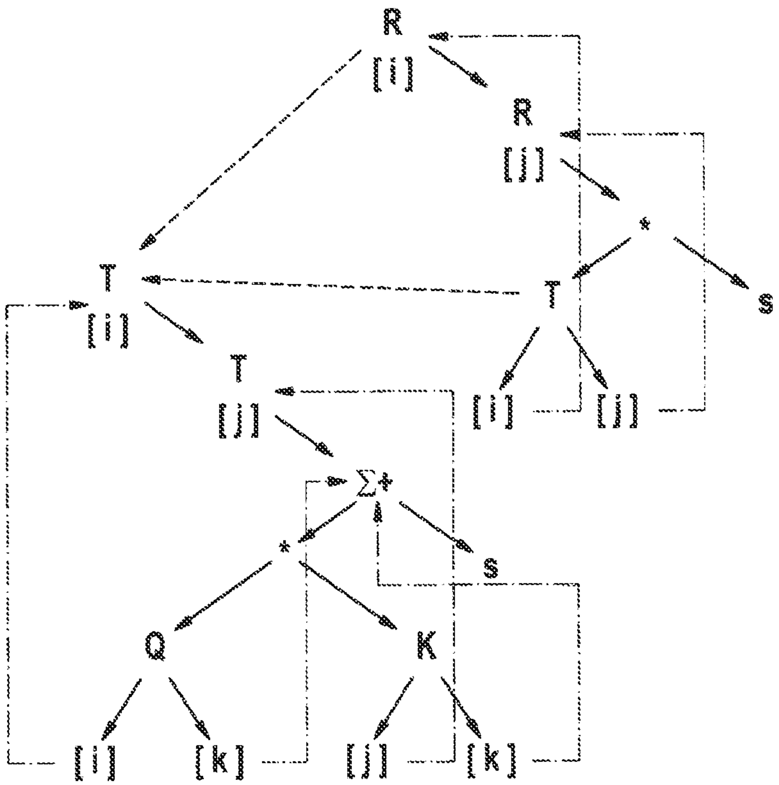
FIG. 2 shows a first graph, according to an example embodiment of the present invention.

Edges connect the nodes in the graph. The first graph 200 shown illustratively in FIG. 2 is a directed graph, in which the directed edges have the following meaning:

An edge, which begins at an input node and ends at an access node, defines an instance of storage-device access to the dimension defined by the access node, which is necessary, if the input defined by the input node is used for the computation. The access node defines, for example, an instruction to write the values of a tensor from this dimension into the first storage area 110 for the input.

An edge, which begins at a computation node and ends at another node, defines a computation of a partial result, using the operation, which is specified by the computation node and is performed on operands that are defined by the other nodes. In the example, another node may be an input node, another computation node, a reduction node, or a tensor node.

An edge, which begins at a reduction node and ends at another node, defines a computation of a partial result, using the operation, which is specified by the reduction node and is performed on operands that are defined by the other nodes. In the example, another node may be an input node, a computation node, another reduction node, or a tensor node. At least one of the other nodes defines a multidimensional input for the reduction node. Another node may define a scalar, which comes from a tensor, as a starting value for the computation of an output.

An edge, which begins at a tensor node, may end at a computation node, a reduction node, or another tensor node. This edge may be of a first edge type, which defines a program loop for repeated execution of a computation. This computation is defined, for example, by a subgraph of the graph, whose root is the node, at which the edge of the first edge type ends. The edge may be of a second edge type, which defines a partial result necessary for repeated computation in the program loop. In this case, the subgraph includes at least one node, which defines a reference to the partial result. A position of this node in a structure of the subgraph determines an order for the computation, using the partial result. The reference may be represented by an additional edge of a third edge type in the graph, which connects this node directly to the same node, to which the edge of the second edge type ends. The program loop may be represented in the graph by an edge of a fourth edge type.

In the example, the edges of the third edge type and the fourth edge type are assigned as a characteristic to the node, at which they begin. Starting from this node, the edges of the third type may be defined by specifying the upward movements and by specifying at least one movement following them, along an edge of the second edge type. The edges of the fourth type may be defined by specifying the number of upward movements in the graph, starting from this node. An upward movement refers to a movement from the node, along an edge, in the direction of the root node of the graph.

In the example, the edges of the first edge type, the second edge type, the third edge type, and the fourth edge type are directed edges. Directed edges of a fifth edge type begin at a reduction node, a computation node, or an input node, and end at another node.

In the graph shown in FIG. 2, the edges are represented as follows:

- Edges of the first edge type and of the fifth edge type are represented by arrows;
- edges of the second edge type are represented by dotted arrows;
- edges of the third edge type are represented by dashed arrows;
- edges of the fourth edge type are represented by dot-dash arrows.

The graph in FIG. 2 shows a first representation of the following computational algorithm $R_{ij}$ for a scalar s and matrices Q and K:

$$R_{ij} = sT_{ij}$$

$$T_{ij} = \sum_k Q_{ik} K_{kj}^T$$

Figure 3:
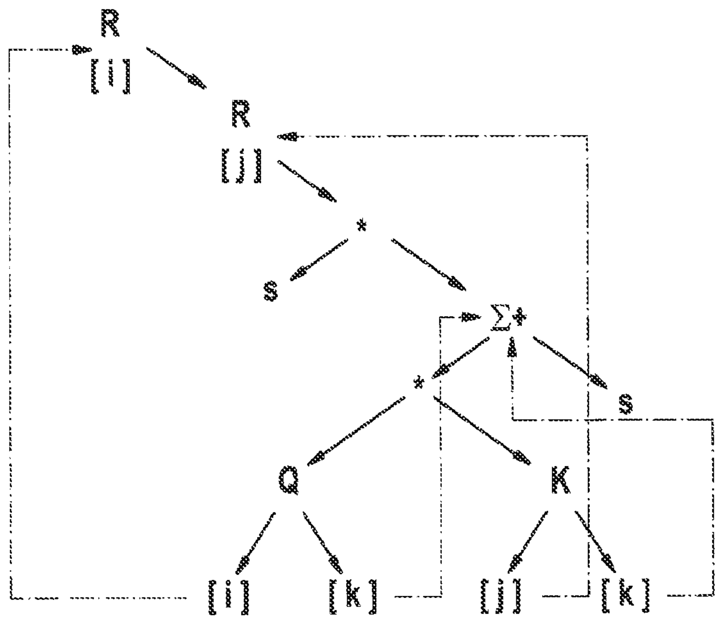
FIG. 3 shows a second graph, according to an example embodiment of the present invention.

A second representation of the same computational algorithm $R_{ij}$ is shown in FIG. 3:

$$R_{ij} = s\sum_k Q_{ik} K_{kj}^T$$

In the example, tensor nodes are denoted by capital letters; a dimension of an interval for a program loop for repeated execution of a computation at the specific tensor node being shown in square brackets [ ]. The root node of the specific graph is defined by a tensor node, which is assigned one of the dimensions of the result. An input node, by which one of the matrices is accessed from the computational algorithm, is denoted by the same capital letter, by which the matrix is denoted. In the example, each of the input nodes is assigned an access node for each dimension of the respective matrix; the specific dimension being indicated in square brackets [ ]. Assuming that the dimension begins with zero, the magnitude of the specific dimension may be indicated in the square bracket as a colon followed by a number, which indicates the magnitude. Computation nodes, which define algebraic operations, are provided with the mathematical symbol, which they define. In the example, a multiplication of s by the sum is represented by a computation node denoted by *. Reduction nodes are denoted by the operation, which is used for the reduction. If the reduction requires an algebraic operation, this may be assigned to the reduction node as a characteristic. In the example, the reduction node is denoted by Σ+, since it is a summation.

An evaluation of boundary conditions may be provided during the generation of instructions from the graph. For example, the order of computations, which is defined by edges of the third edge type or the fourth edge type, is evaluated and adhered to by the instructions generated.

Boundary conditions may be defined as a characteristic and assigned to a node. An algebraic operation, which requires a specific sequence of operands in the input of storage device 108, may be assigned as a characteristic to the node, which defines this operation. This characteristic is evaluated and maintained by the instructions generated.

In the example, a pattern is defined, which has a structure that determines a computational algorithm, which may be processed particularly effectively by the hardware accelerator. The pattern determines the instructions, which match a certain hardware of the hardware accelerator particularly well. Using the method described in the following, the instructions particularly well-suited to this hardware may be generated.

Different hardware accelerators may include different hardware having electrical circuits, which may process computational algorithms of a particular structure in an accelerated manner.

The nodes of the graph define operations or operands for executing the computational algorithm. The edges define an order of performing operations for executing the computational algorithm.

Figure 4:
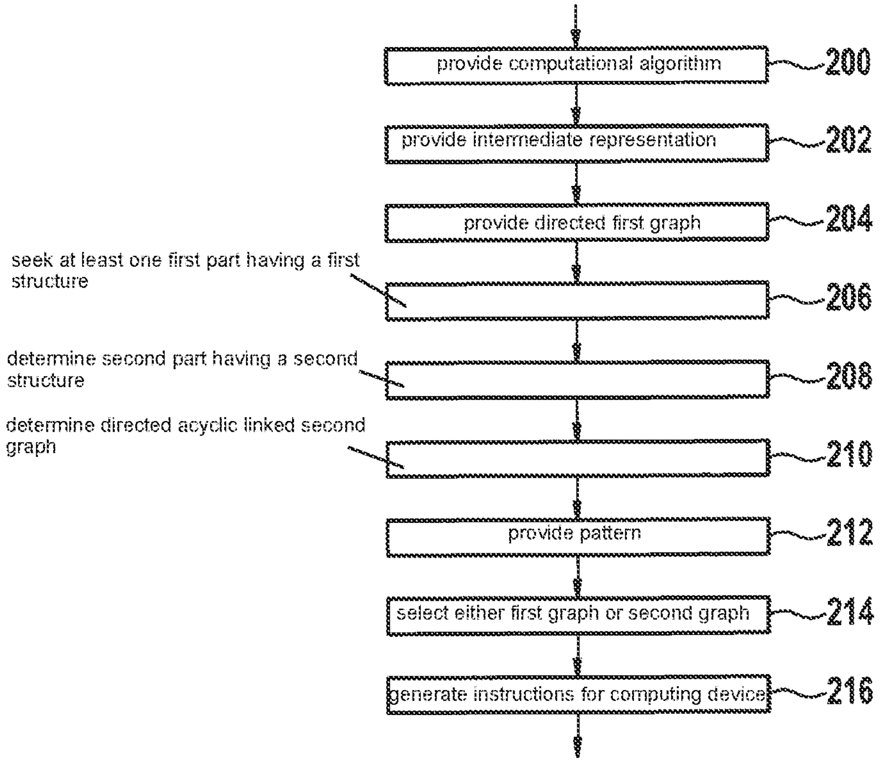
FIG. 4 shows steps in a method to generate instructions for a computing device, according to an example embodiment of the present invention.

The method for generating the instructions is described below with reference to FIG. 4.

In a first step 200, a first structure for a graph is provided, which defines at least one operation that may be executed by a hardware accelerator. For example, the first structure defines a set-up of nodes and edges in the graph.

Different options for providing the first structure are specified in the following.

In a step 200, a computational algorithm is provided.

In a step 202, the intermediate representation for the computational algorithm is subsequently provided.

A directed, first graph, which includes nodes and edges and represents the computational algorithm, is then provided in a step 204. In the example, the first graph has the characteristic of a tree.

In the example, the first graph is determined as a tree from the graph for the intermediate representation, so that only one path is present, which connects each pair of nodes in the first graph. In the intermediate representation, parent and child nodes associated with each other already have this characteristic. Edges, which define data dependency in the intermediate representation, are assigned to the third edge type in the first graph. Edges, which define an iteration in the intermediate representation, are assigned to the fourth edge type in the first graph.

The edges of the first, the second and the fifth edge type define a graph having a tree structure, in which a node that defines an iterator may be reached from a node that uses the iterator, via a path, which is only reachable via directed edges of the first, second, and fifth edge type. The directed edge of the third edge type or the fourth edge type leads to the node, which uses it. An edge of the third edge type may be implemented by a path in the tree along the first, second, and fifth edge types. For the pattern recognition, the path may be stored in an input node. By specifying a path length, for example, in the form of an integer, an edge of the fourth edge type may be defined in the node, which defines the iterator. By specifying this path length alone, the path in the tree, starting from the node, which uses the iterator, to the node, which defines the iterator, may be covered.

In the example, this path length replaces the specification of the node, which uses the iterator.

In the example, the path length is stored in a leaf of the tree, that is, in an access node, which defines the iterator. The iterator corresponds, for example, to a dimension, over which a tensor, which is defined in a tensor node that uses this iterator, is computed. The iterator corresponds, for example, to a dimension, over which a reduction, which is defined in a reduction node that uses this iterator, is computed.

In the example, a data dependency for a plurality of program loops or references is stored in the respective leaves of the tree.

As a function of that, a data structure is defined, which is described below in more detail, and by which pattern matching may be carried out, using a plurality of instructions from a set of instructions.

To that end, in the example, a root-to-leaf path of an instruction is defined as a character string of designations. A designation includes the node type of a node in the path or an ordered list of the designations of the child node, which is ordered in accordance with the direction of the directed path.

The designations may be determined from the above-described definition for the types of nodes with the aid of a finite state machine for the comparison of the character strings. To that end, for example, the Aho-Corasick algorithm according to Alfred V. Aho and Margaret J. Corasick, 1975, "Efficient String Matching: An Aid to Bibliographic Search," Commun. ACM 18, 6 (June 1975), 333-340, https://doi.org/10.1145/360825.360855, may be used.

The first graph defines first instructions for computing device 102 for executing the computational algorithm.

In a step 206, at least one first part having a first structure is sought in the first graph. In the example, the first structure is defined by a first character string. In this manner, the problem of the pattern matching is reduced to a problem of a character-string comparison of the first character string to a character string, which represents the pattern.

In a step 208, a second part having a second structure is determined as a function of the at least one first part. In the example, the second structure is defined by a second character string. In the example, the structures or patterns for replacement are determined in pairs.

In a step 210, a directed, acyclic, linked second graph having nodes and edges is determined as a function of the first graph. In the second graph, the first part is replaced by the second part.

The second graph defines second instructions for computing device 102 for executing the computational algorithm.

In a step 212, a pattern for at least a part of a graph is provided, whose nodes and edges are defined by instructions that are executable by computing device 102. Instructions executable by the computing device may be specified, determined or received. In this case, the pattern may be determined as a function of the executable instructions. In the example, the pattern is represented by at least one part of a graph, which, as described for the intermediate representation, is determined from the executable instructions and has a structure of a tree. The pattern is defined as a corresponding character string. The pattern matching is accomplished by a character-string comparison of the first character string or the second character string with a character string, which represents the pattern.

In a step 214, either the first graph or the second graph is selected as a function of the pattern, in order to generate instructions for computing device 102.

The first graph and the second graph are candidates, which may be searched, using the pattern, in order to determine a suitable graph for generating the instructions to process the computational algorithm.

For the pattern matching, instructions for a kernel that are in conflict with each other may be found.

In the example, a conflict is determined when two suitable instructions include the same node in the tree of a graph for the pattern. In this case, an optimization problem may be defined as a function of a global cost function, which assigns each instruction a cost function. In this aspect, a solution to the optimization problem is determined as a function of the global cost function; the solution determining the pattern, according to which the candidates are searched.

An algorithm for that includes, for example, a selection function, by which from all possible, suitable patterns, the pattern, which constitutes the solution to the optimization problem, is selected.

For example, the instructions, which are most suitable, are selected as a function of a list of instructions, which are in conflict and are found during traversal of the tree, on a branch of the tree, starting out from a leaf.

The list of instructions is generated by running through the tree once, starting from its root. The positions, at which the pattern-seeking algorithm finds a pattern, are added to the list.

The order, in which the tree is run through, is, for example: right-to-left pre-order.

This is a recursive algorithm, which does the following in each node:

1) The data of the current node are read;
2) The right subtree is then visited recursively;
3) The left subtree is then visited recursively.

For example, a branch is not followed further, if the cost function of a suitable instruction does not produce an improvement of the global cost function over the next possible, suitable instruction. A subsequent instruction, which does not overlap with a current node, may be determined for each instruction suitable for a current node.

If this instruction improves the global cost function, then the next node, which is reachable from the current node, is additionally determined. A function for implementing the algorithm may provide that an empty value be returned for nodes, which do not constitute a possible continuation.

During the search for the pattern in the first graph, a plurality of patterns may be found, which cover the same node(s) in the first graph. This means that the patterns or instructions overlap in this node or these nodes. This is not permissible, since each pattern found, that is, each instruction, must stand on its own.

When a plurality of patterns are found, a selection of a pattern is made, and the next pattern is selected in such a manner, that it does not overlap with one of the patterns already selected.

For the second graph or other candidates, one proceeds as in the case of the first graph.

A program loop for a computational algorithm may be split up into an inner and an outer program loop. An iteration domain of the inner program loop may be limited, and in this manner, a quantity of work of the inner program loop may be limited. At least one parameter may be determined, which characterizes a storage frame in the storage device, and which associates a workload with an instruction. In the example, a tensor node describes an independent element, whose order in a program run does not influence the result. In the example, the tensor node is assigned a factor, which is used during the code generation, in order to determine suitable outer program loops and calls for the instruction for the tensor node. In this manner, globally well-suited parameters may be determined, after the instructions are matched.

Using the factor, partial results are determined, which are stored and used in the subsequent computations. Therefore, for each partial result, a new tensor node and a tensor matching it are generated. The tensor, in which the partial result is stored, is addressable and retrievable for later use via the tensor node.

In a step 216, the instructions for computing device 102 are either generated as a function of the first graph, if it is selected in step 214, or generated as a function of the second graph, if it is selected in step 214.

In this manner, subgraphs are found, which correspond to a search pattern, and new subgraphs are generated, which define the instructions, by which a partial result of a part of the computational algorithm may be determined completely.

Different computing devices 102 may determine different partial results at different rates or levels of precision, using different, specialized hardware. The pattern determines the instructions, which match certain hardware particularly effectively. In this manner, the instructions particularly well-suited to this hardware may be generated.

The first structure may define a first partial graph, which includes a plurality of nodes and edges that define at least one operation for at least two operands in a first order.

In this case, the second structure defines, for example, a second subgraph, which is defined by the nodes of the first subgraph. The edges of the second subgraph define at least one operation for the at least two operands in a second order. The at least one operation may be an element-by-element, arithmetic operation.

Figure 5:
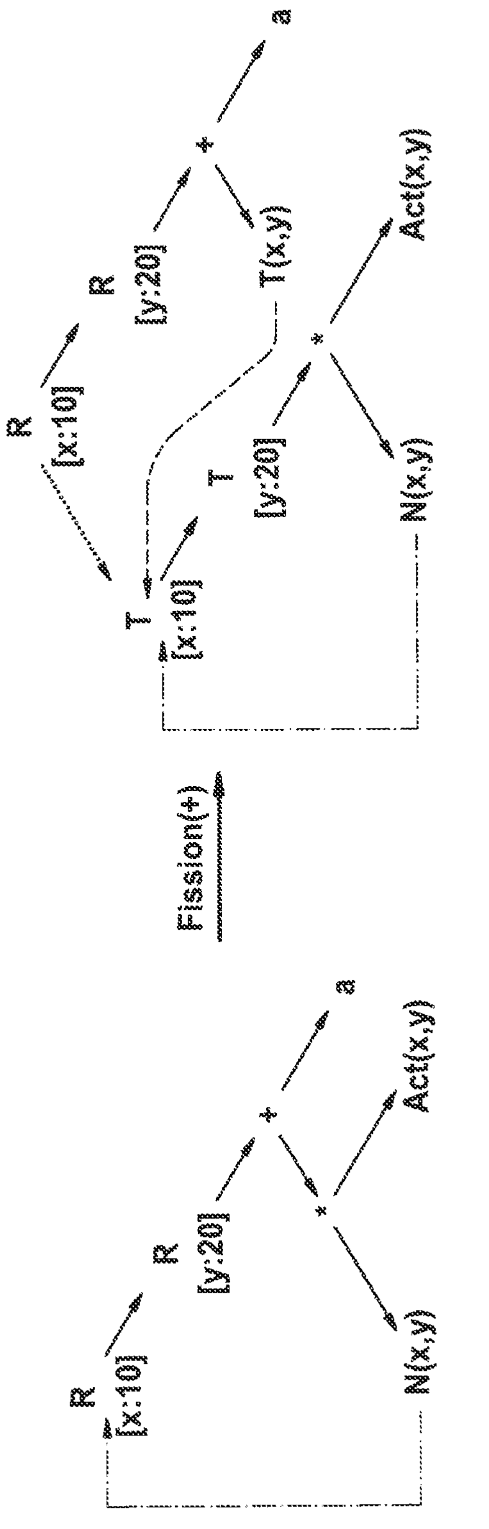
FIG. 5 shows a first transformation for a graph, according to an example embodiment of the present invention.

The first structure may be defined as represented in FIG. 5, on the left. The second structure may be defined as represented in FIG. 5, on the right. The first structure includes a first node R[x:10], at which a first edge begins. The first edge ends at a second node R[y:20]. A second edge, which ends at a third node+, begins at second node R[y:20].

Third node+ defines an operation, addition, whose operands include a first subgraph, in the example, a scalar a, and a second subgraph N(x,y)*Act(x,y). Second node R[y:20] defines a first program loop for repeated execution of the operation. First node R[x:10] defines a second program loop for repeated execution of the first program loop.

In this case, the second structure includes first node R[x:10], at which the first edge, which ends at second node R[y:20], begins. The second edge, which ends at third node+, begins at second node R[y:20]. The operands for the operation, which third node+ defines, include first subgraph a and a fourth node T(x, y).

Fourth node T(x, y) replaces the second subgraph N(x,y)*Act(x,y) from the first subgraph of the first structure. The second structure includes a third edge, which begins at first node R[x:10] and ends at a fifth node T[x:10]. The second structure includes a fourth edge, which begins at fifth node T[x:10] and ends at a sixth node T[y:20]. Sixth node T[y:20] defines a third program loop for repeated execution of an operation of second subgraph N(x,y)*Act(x,y). Fifth node T[X:10] defines a fourth program loop for repeated execution of the third program loop. A fifth edge, which begins at fourth node T(x,y) and ends at fifth node T[x:10], defines an order of execution of the fourth program loop before the second program loop. In this manner, subgraphs are generated, which define a part of the computational algorithm, by which a partial result of a part of the computational algorithm may be determined completely. The additional edge defines the order of execution, so that data dependencies between the partial result and the use of the partial result may be maintained in the computational algorithm.

Figure 6:
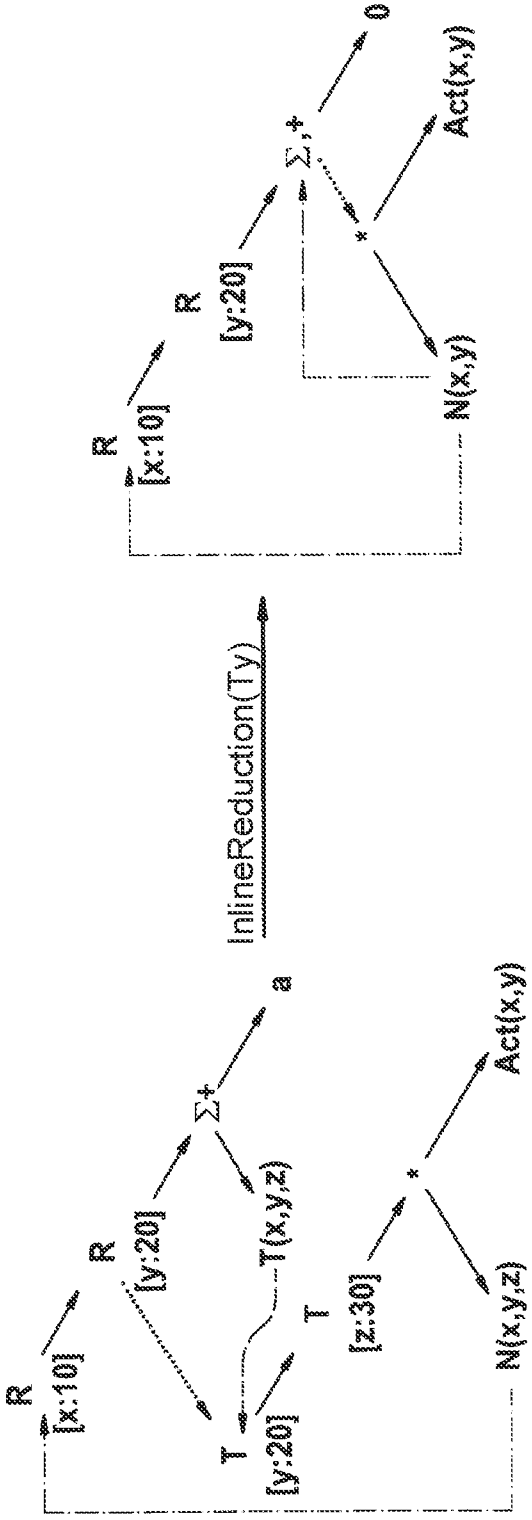
FIG. 6 shows a second transformation for a graph, according to an example embodiment of the present invention.

The first structure may be defined as represented in FIG. 6, on the left. The second structure may be defined as represented in FIG. 6, on the right. The first structure may include a first node R[x:10], at which a first edge, which ends at a second node R[y:20], begins. A second edge, which ends at a third node T[y:20], begins at second node R[y:20]. A third edge, which ends at a fourth node T[z:30], begins at third node T[y:20]. Fourth node T[z:30] defines a first program loop for repeated execution of a part of the computational algorithm defined by a subgraph; third node T[y:20] defines a second program loop for repeated execution of the first program loop. Second node R[y:20] defines a third program loop for repeated execution of the second program loop. First node R[x:10] defines a fourth program loop for repeated execution of the third program loop.

A fourth edge, which ends at a fifth node Σ+, begins at second node R[y:20]. A fifth edge, which ends at a sixth node T(x,y,z), begins at fifth node Σ+. Sixth node T(x,y,z) defines a partial result, which may be determined by processing the part of the computational algorithm defined by the subgraph. Fifth node Σ+ defines an operation, which utilizes the partial result. A sixth edge begins at sixth node T(x,y,z) and ends at third node T[y:20]. The sixth edge defines an order of execution of the second program loop for determining the partial result prior to a first execution of the second operation in the third program loop.

In this case, the second structure includes first node R[x:10], second node R[y:20], and fifth node Σ+. The first edge begins at first node R[x:10] and ends at second node R[y:20]. The fourth edge begins at second node R[y:20] and ends at fifth node Σ+. Sixth node T(x,y,z) is replaced by the subgraph.

The first structure may define a first subgraph, which includes a plurality of nodes and edges that define a first array in a storage device of computing device 102, for at least two dimensions of an operand. In this case, the second structure may define a second subgraph, which is defined by the nodes of the first subgraph; the edges of the second subgraph defining a second array in the storage device, for the at least two dimensions of the operand.

Figure 7:
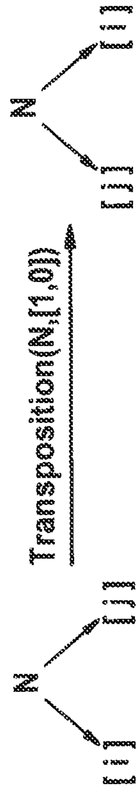
FIG. 7 shows a third transformation for a graph, according to an example embodiment of the present invention.

In one aspect, the first array may define a first tensor N for data; the second array defining a second tensor $N^T$ for the data. Second tensor $N^T$ is defined by the transposed, first tensor N. In FIG. 7, corresponding input node N is represented on the left for first tensor N and on the right for second tensor $N^T$. In the second array, the access nodes are interchanged with respect to the first array.

Figure 8:
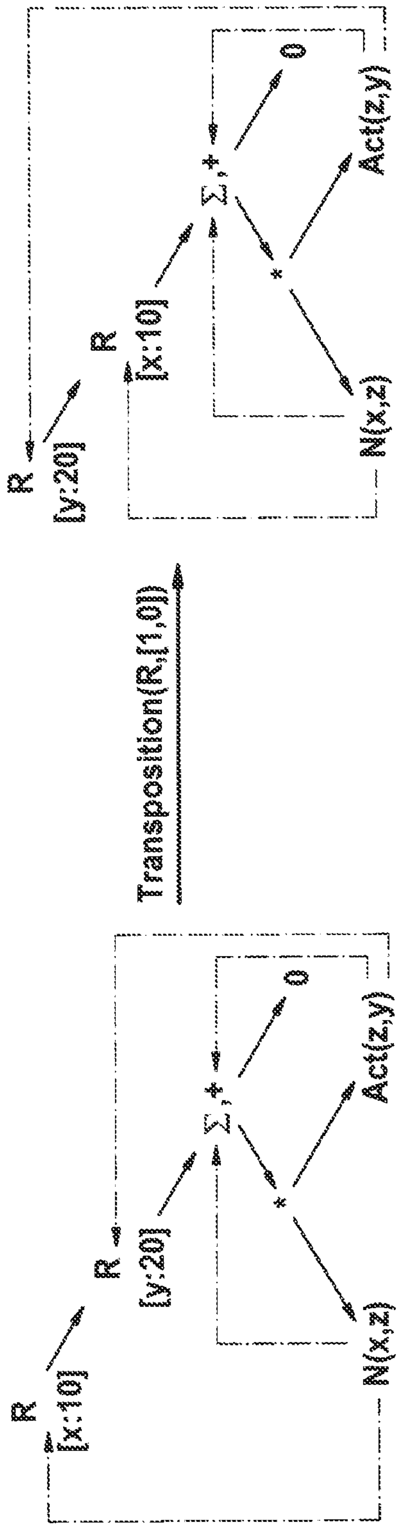
FIG. 8 shows a fourth transformation for a graph, according to an example embodiment of the present invention.

In another aspect, the first array may define a first tensor R for data; the second array defining a second tensor $R^T$ for the data. Second tensor $R^T$ is defined by the transposed, first tensor R. In FIG. 8, the first array of corresponding tensor nodes R[x:10] and R[y:20] is represented on the left for first tensor R. In FIG. 8, the second array is represented on the right for second tensor $R^T$. In this case, the program loops are interchanged.

The first array may have more dimensions than the second array. The second array is determined, for example, by linearizing a plurality of dimensions of the first array.

The first array may have fewer dimensions than the second array. In this case, the second array may be determined by replicating at least one dimension of a plurality of dimensions of the first array, or by adding a dimension filled in with at least one value, in particular, with at least one zero.

Figure 9:
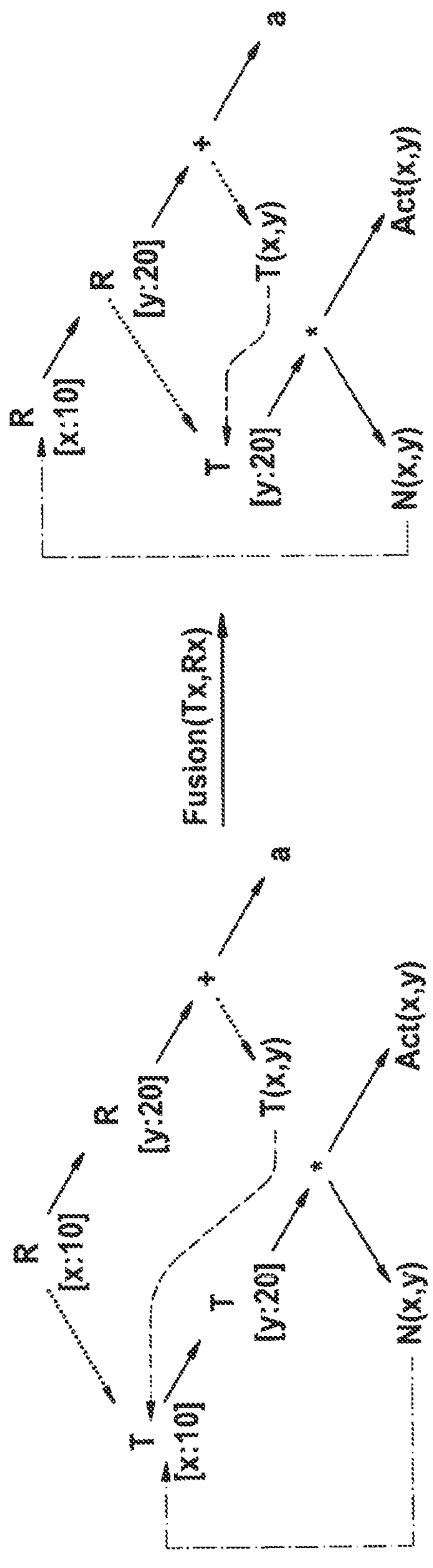
FIG. 9 shows a fifth transformation for a graph, according to an example embodiment of the present invention.

FIG. 9 shows the fusion of two outermost tensor nodes. The first structure may include a plurality of nodes and edges that define a first array in a storage device of computing device 102, for at least two dimensions x, y of an operand.

The first structure may be defined as represented in FIG. 9, on the left. The second structure may be defined as represented in FIG. 9, on the right. The first structure includes a first node R[x:10], at which a first edge of the first edge type begins. The first edge ends at a second node R[y:20]. A second edge of the first edge type, which ends at a third node+, begins at second node R[y:20].

Third node+ defines a first operation, in the example, addition, whose operands include a first subgraph, in the example, a scalar a, and a second subgraph, which includes a fourth node T(x,y), which defines a partial result.

Second node R[y:20] defines a first program loop for repeated execution of the first operation. First node R[x:10] defines a second program loop for repeated execution of the first program loop.

A third edge of the second edge type begins at first node R[x:10]; the third edge ending at a fifth node T[x:10]. A fourth edge of the first edge type begins at fifth node T[x:10]; the fourth edge ending at a sixth node T[y:20].

A fifth edge of the first edge type, which ends at a seventh node *, begins at sixth node T[y:20]. Seventh node * defines a second operation, in the example, a multiplication of an eighth node N(x,y) and a ninth node Act(x,y).

Sixth node T[y:20] defines a third program loop for repeated execution of the second operation. Fifth node T[x:10] defines a fourth program loop for repeated execution of the third program loop.

A sixth edge of the third edge type begins at fourth node T(x,y) and ends at fifth node T[x:10].

In this case, the second structure includes first node R[x:10], second node R[y:20], third node+, the first subgraph, and the second subgraph, as described for the first structure; in the second subgraph, fourth node T(x,y) being replaced by sixth node T[y:20]. Seventh node *, eighth node N(x,y), and ninth node Act(x, y) are positioned as described for the first structure.

Consequently, the second and the fourth program loops are merged. Thus, more rapid reuse of partial results is attained.

Figure 10:
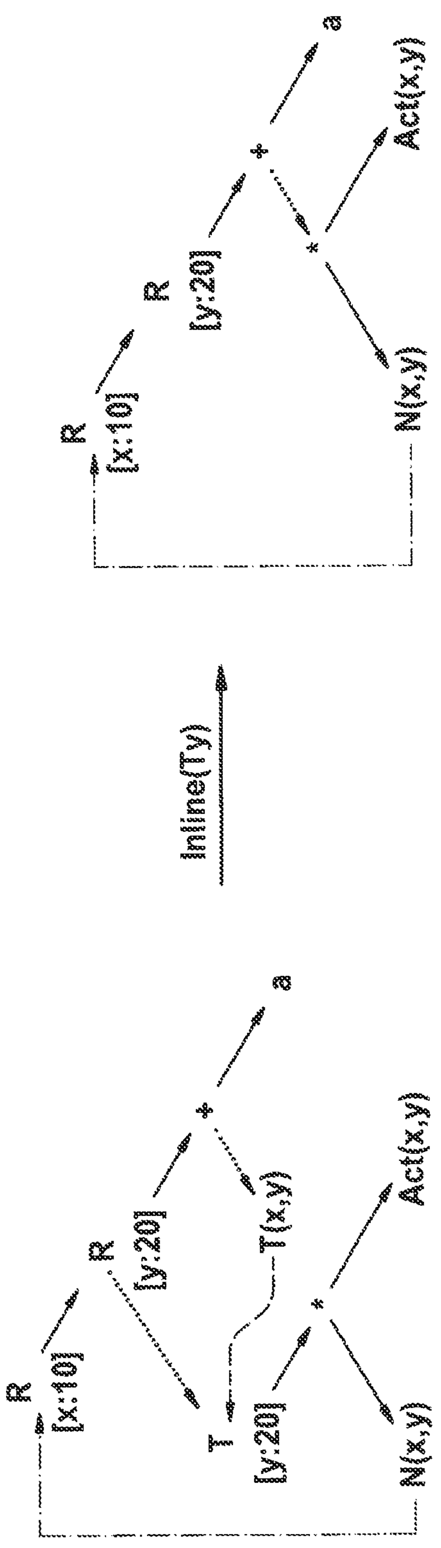
FIG. 10 shows a sixth transformation for a graph, according to an example embodiment of the present invention.

FIG. 10 shows the insertion of an arithmetic operation, by which a partial result is determined, into a subgraph, which had previously used this partial result.

The first structure may include a plurality of nodes and edges that define a first array in a storage device of computing device 102, for at least two dimensions x, y of an operand.

The first structure may be defined as represented in FIG. 10, on the left. The second structure may be defined as represented in FIG. 10, on the right. The first structure includes a first node R[x:10], at which a first edge of the first edge type begins. The first edge ends at a second node R[y:20]. A second edge of the first edge type, which ends at a third node+, begins at second node R[y:20].

Third node+ defines a first operation, in the example, addition, whose operands include a first subgraph, in the example, a scalar a, and a second subgraph, which includes a fourth node T(x,y) that defines a partial result.

Second node R[y:20] defines a first program loop for repeated execution of the first operation. First node R[x:10] defines a second program loop for repeated execution of the first program loop.

A third edge of the second edge type, which ends at a fifth node T[y:20], begins at second node R[y:20]. A fourth edge of the first edge type begins at fifth node T[y:20]; the fourth edge ending at a sixth node *. Sixth node * defines a second operation, in the example, a multiplication of a seventh node N(x,y) and an eighth node Act(x,y).

Fifth node T[y:20] defines a third program loop for repeated execution of the second operation.

A sixth edge of the third edge type begins at fourth node T(x,y) and ends at fourth node T[y:20].

In this case, the second structure includes first node R[x:10], second node R[y:20], third node+, the first subgraph, and the second subgraph, as described for the first structure; in the second subgraph, fourth node T(x,y) being replaced by fifth node T[y:20]. Sixth node *, seventh node N(x,y), and eighth node Act(x, y) are positioned as described for the first structure.

Figure 11:
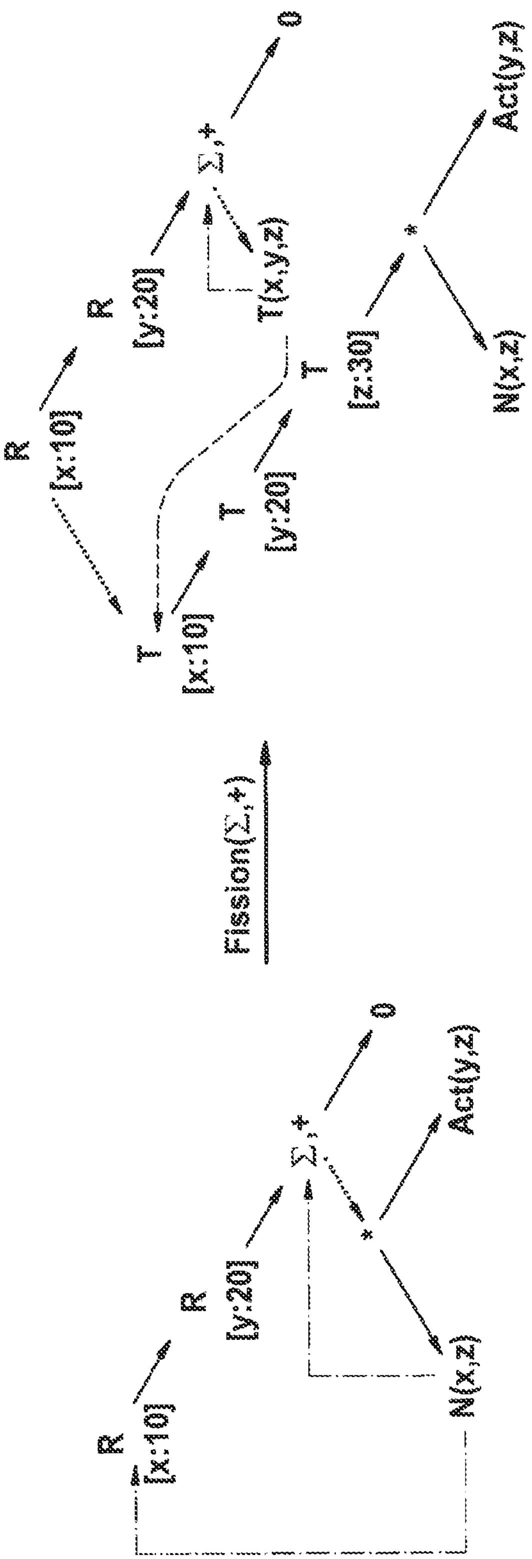
FIG. 11 shows a seventh transformation for a graph, according to an example embodiment of the present invention.

FIG. 11 represents the separation of a reduction from one subgraph into another subgraph. In this manner, a new interim result is formed, which is first determined and subsequently enters into the reduction.

The first structure may be defined as represented in FIG. 11, on the left. The second structure may be defined as represented in FIG. 11, on the right. The first structure may include a first node R[x:10], at which a first edge, which ends at a second node R[y:20], begins. A second edge, which ends at a third node Σ+, begins at second node R[y:20]. A third edge, which ends at a fourth node *, begins at third node Σ+. Fourth node * defines a first operation, in the example, a multiplication of a fifth node N(x,z) and a sixth node Act(z,y), as a function of at least three dimensions. In the example, a first dimension x and a second dimension y are defined for fifth node N(x,z), and the second dimension and a third dimension y are defined for the sixth node Act(z,y). Third node Σ+ defines a second operation and a first program loop for repeated execution of the first operation. By repeated execution of the first program loop, one of the at least three dimensions, in the example, second dimension z, is reduced. A fourth edge begins at third node Σ+; the fourth edge ending at a seventh node 0, which defines a starting value for the reduction. The first node defines a second program loop for repeated execution of the second operation for first dimension x. Therefore, repeated execution over third dimension y is not necessary.

In this example, the second structure defines the first node R[x:10], at which the first edge, which ends at second node R[y:20], begins. The second edge, which ends at third node Σ+, begins at second node R[y:20]. In the second structure, fourth node * is replaced by an eighth node T(x,y,z), which defines a partial result. Third node Σ+ defines the first program loop and the second operation for the eighth node T(x,y,z), that is, the partial result, and for the seventh node, that is, the starting value for the reduction.

The second structure includes a fifth edge, which begins at first node R[x:10] and ends at a ninth node T[y:20]. A sixth edge begins at ninth node T[y:20]; the sixth edge ending at a tenth node T[y:20]. A seventh edge, which ends at an eleventh node T[z:30], begins at tenth node T[y:20]. An eighth edge, which ends at fourth node *, begins at eleventh node T[z:30]. Fourth node * defines the first operation, in the example, the multiplication of fifth node N(x,y,z) and sixth node Act(z,y), as a function of at least three dimensions. In the example, in contrast to the first structure, first dimension x, second dimension z, and third dimension y are defined for fifth node N(x,y,z). Ninth node T[y:20], tenth node T[y:20], and eleventh node T[z:30] define a third program loop for repeated execution of the first operation. In this manner, the same partial result is determined. A ninth edge of the third edge type begins at eighth node T(x,y,z) and ends at ninth node T[y:20]. In this manner, the new data dependency is shown in the second structure. A tenth edge of the fourth edge type begins at eighth node T(x,y,z) and ends at third node Σ+. In this manner, the new program loop is shown in the second structure.

In the example, the data for the operands and operations are defined by an input for the computational algorithm or by a partial result of the computational algorithm.

The first structure may define a first subgraph, which includes a first node N, at which no edge begins. The first node may define a first storage area for computing device 102 in at least two dimensions [i], [j]. This first structure includes a second node, which defines an operation for values in the first storage area. In this case, the method may provide that a second storage area for computing device 102 be defined in at least one of the dimensions [j] of the first storage area. In this case, the second structure defines a second subgraph, in which the first node of the first subgraph is replaced by a third node N, which defines the second storage area. In this case, for at least one dimension of the first storage area, which is missing in the second storage area, the second structure defines a program loop, which defines a repeated execution of the operation with the second operand, over this dimension.

A plurality of first structures may be provided; a plurality of second graphs being determined for first structures, which are found in the first graph. The plurality of first structures may be searched for in the plurality of second graphs. The search may be repeated iteratively, until no further subgraph corresponding to the search pattern is found.

The first graph and the resulting plurality of second graphs determine candidates, which may be searched, using the pattern, in order to determine a suitable graph for generating the instructions for processing the computational algorithm. In the case of connecting a hardware accelerator or inputting a computational algorithm previously unknown, this may take place prior to its processing by computing device 102. In this manner, the correct instructions for any hardware accelerators and any computational algorithms may be generated during operation of computing device 102.

This computing device 102 may be driven by any hardware accelerators, which may be manufactured independently of the computing device, itself.

In an artificial neural network, the computational algorithm may define or include a kernel, which defines the artificial neural network.

Figure 12:
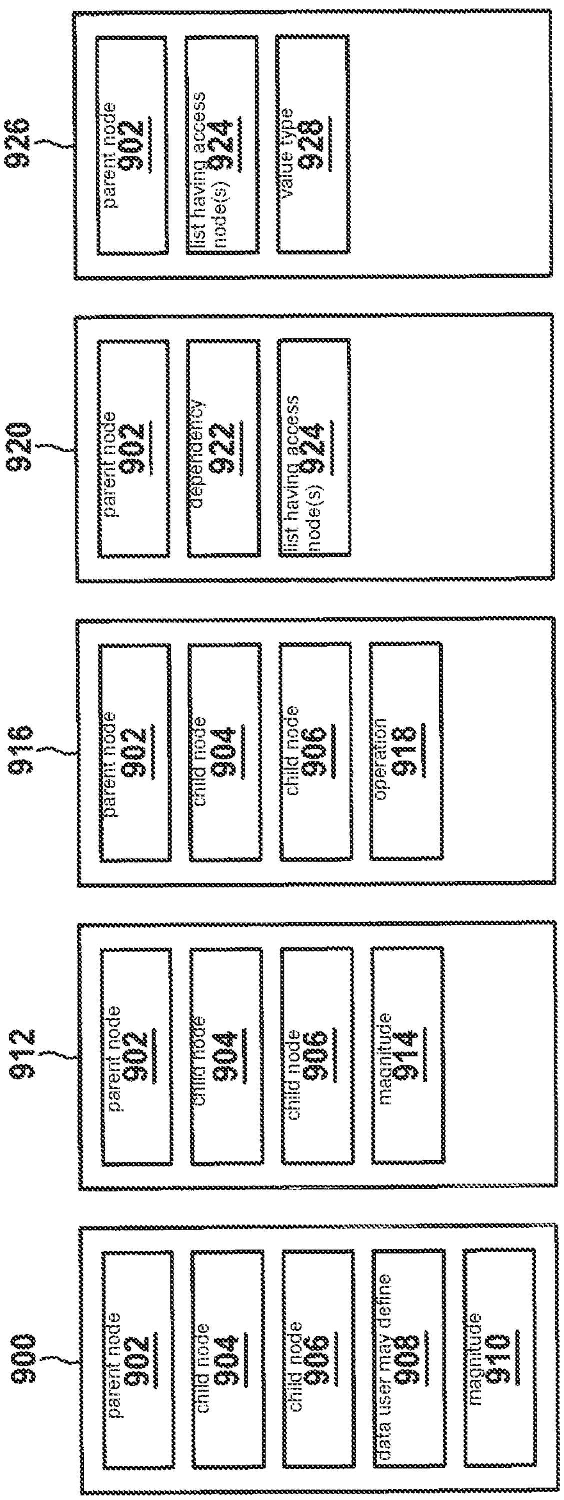
FIG. 12 shows data structures, according to an example embodiment of the present invention.

In order to generate the graphs in an automated manner, a data structure may be provided, which is defined for a node as a function of its node type, as follows. In the example, the type of node is one from the group tensor node, reduction node, computation node, input node, access node. Examples of data structures are shown in FIG. 12.

In the following, a parent node denotes a node, at which an edge begins; the edge ending at the node, whose data structure includes a data field that defines the parent node. In the following, a child node denotes a node, at which an edge begins, whose data structure includes a data field that defines the child node. In the example, if no parent node or no child node is present, this is defined by an empty entry in the corresponding data field.

The node type tensor node is defined by a data structure 900, which includes a data field 902 for a parent node, a data field 904 for a child node, which is reachable by an edge of the first edge type, a data field 906 for a child node, which is reachable by an edge of the second edge type, a data field 908 for a data user, and a data field 910 for a magnitude of at least one dimension of the tensor.

The data field 902 for the parent node may define another tensor node or contain an empty entry.

The data field 904 for the child node, which is reachable by an edge of the first edge type, may define a node from the group tensor node, reduction node, computation node, input node.

The data field 906 for the child node, which is reachable by an edge of the second edge type, may define another tensor node.

The data field 908 for the data user may define an input or contain an empty entry.

The data field 910 for the magnitude may define an interval. In the example, an interval includes an entry for an upper limit of the dimension, a lower limit of the dimension, and an increment for repeated execution of the program loop. The upper limit, the lower limit, and the increment may be integer values.

The node type, reduction node, is defined by a data structure 912, which includes a data field 902 for a parent node, a data field 904 for a child node, which is reachable by an edge of the first edge type, a data field 906 for a child node, which is reachable by an edge of the second edge type, and a data field 914 for a magnitude of at least one dimension for the reduction.

The data field 902 for the parent node may define a node from the group tensor node, reduction node, computation node.

The data field 904 for the child node, which is reachable by an edge of the first edge type, may define an input node.

The data field 906 for the child node, which is reachable by an edge of the second edge type, may define a node from the group reduction node, computation node, input node.

The data field 914 for the magnitude may define an interval. In the example, interval includes an entry for an upper limit of the dimension, a lower limit of the dimension, and an increment for repeated execution of the computation for the reduction. The upper limit, the lower limit, and the increment may be integer values.

The node type computation node is defined by a data structure 916, which includes a data field 902 for a parent node, a data field 904 for a child node, which is reachable by an edge of the first edge type, a data field 906 for a child node, which is reachable by an edge of the second edge type, and a data field 918 for an operation.

The data field 902 for the parent node may define a node from the group tensor node, reduction node, computation node.

The data field 904 for the child node, which is reachable by an edge of the first edge type, may define a node from the group reduction node, computation node, input node.

The data field 906 for the child node, which is reachable by an edge of the second edge type, may define a node from the group reduction node, computation node, input node.

The data field 918 for the operation may define an arithmetic operation, e.g., addition +, subtraction −, multiplication *, division :, or also other unary and binary operations, such as sine, cosine, tangent, maximum (max), minimum (min), exponential function, or bitshift.

The node type input node is defined by a data structure 920, which includes a data field 902 for a parent node, a data field 922 for a dependency or order on the basis of an edge of the third edge type, and a data field 924 for one or more child nodes.

The data field 902 for the parent node may define a node from the group tensor node, reduction node, computation node.

The data field 922 for a dependency on the basis of an edge of the third edge type may define a tensor node, to which the edge leads, or may contain an empty entry.

The data field 924 for the one or more child nodes may include a list having one or more access nodes.

The node type, access node, is defined by a data structure 926, which includes a data field 902 for a parent node, a data field 928 for a type of value, and a data field 924 for one or more child nodes.

Data field 902 for the parent node may define a node from the group input nodes or access nodes.

Data field 928 for the value type may define a type for the data, which the access node references from the storage device. The type may be iterator, operation, or scalar constant.

Data field 924 for the child node may include a list having one or more access nodes or may have an empty entry.

The access nodes may define one of the dimensions of a vector, a tensor, or a matrix in storage device 108. The access to a plurality of dimensions may be defined by a linkage of access nodes; a first access node defining a first dimension, and a last access node in the linkage defining a highest dimension. In this context, an access node for the first dimension is defined as a child node in an input node. The access node for the first dimension defines an access node for the second dimension as a child node. This is continued until an access node defines the last access node for the highest dimension. The last access node defines the empty entry for the child node.

The instructions for the pattern search may be determined by a procedure described in Alfred V. Aho and Margaret J. Corasick, 1975, "Efficient String Matching: An Aid to Bibliographic Search," Commun. ACM 18, 6 (June 1975), 333-340, https://doi.org/10.1145/360825.360855.

The pattern recognition may be carried out, using a searching operation described in Christoph M. Hoffmann and Michael J. O'Donnell, 1982, "Pattern Matching in Trees," J. ACM 29, 1 (January 1982), 68-95, https://doi.org/10.1145/322290.322295.

What is claimed is:

1. A computer-implemented method to generate instructions for a computing device for executing a computational algorithm, the method comprising the following steps:

providing a directed, first graph having nodes and edges, which defines first instructions for the computing device for executing the computational algorithm;

searching for at least one first part that has a first structure in the first graph;

determining a second part having a second structure as a function of the at least one first part;

determining a directed, second graph having nodes and segments as a function of the first graph;

replacing the first part with the second part in the second graph, the second graph defining second instructions for the computing device for executing the computational algorithm;

providing a pattern for at least a part of a graph, whose nodes and edges are defined by instructions that are executable by the computing device; and generating the instructions for the computing device either as a function of the first graph or as a function of the second graph, the first graph or the second graph being selected as a function of the pattern, to generate the instructions for the computing device.

2. The method as recited in claim 1, wherein as a function of the computational algorithm, a graph is provided, which includes a node that defines an iterator for an operation for executing the computational algorithm; a length of a path in the graph between a node which uses the iterator, and the node which defines the iterator, being determined; in the node which uses the iterator, a reference to the node which defines the iterator being replaced by an information item, which includes the length of the path; and the directed, first graph being determined as a function of the node, which includes the length of the path.

3. The method as recited in claim 2, wherein the first structure defines a first subgraph, which includes a plurality of nodes and edges that define at least one operation for at least two operands in a first order; the second structure defines a second subgraph, which is defined by the nodes of the first subgraph, the edges of the second subgraph defining at least one operation for the at least two operands in a second order; the at least one operation defining an element-by-element operation.

4. The method as recited in claim 1, wherein the first structure is defined by a first character string, which determines a path in the first graph; the second structure being defined by a second character string, which determines a path in the second graph.

5. The method as recited in claim 4, wherein the first character string and/or the second character string includes an ordered list of designations for nodes in the path, which define the path.

6. The method as recited in claim 1, wherein the first structure defines a first subgraph, which includes a plurality of nodes and edges that define a first array in a storage device of the computing device, for at least two dimensions of an operand; the second structure defines a second subgraph, which is defined by the nodes of the first subgraph, edges of the second subgraph defining a second array in the storage device, for the at least two dimensions of the operand.

7. The method as recited in claim 6, wherein the first array defines a first tensor for data, the second array defines a second tensor for the data; the second tensor is defined by the first tensor transposed.

8. The method as recited in claim 6, wherein the first array has more dimensions than the second array; the second array is determined by linearizing a plurality of dimensions of the first array.

9. The method as recited in claim 6, wherein the first array has fewer dimensions than the second array; the second array is determined by replicating at least one dimension of a plurality of dimensions of the first array, or by adding a dimension filled in with at least one value, including at least one zero.

10. The method as recited in claim 6, wherein the data are defined by an input for the computational algorithm, or by a partial result of the computational algorithm.

11. The method as recited in claim 1, wherein the first structure defines a first subgraph, which includes a first node, at which no edge begins; the first node defining a first storage area for the computing device in at least two dimensions; the first structure including a second node, which defines an operation for values in the first storage area; a second storage area for the computing device being defined in at least one of the dimensions of the first storage area; the second structure defining a second subgraph, in which the first node of the first subgraph is replaced by a third node, which defines the second storage area; for at least one dimension of the first storage area, which is missing in the second storage area, the second structure defining a program loop, which defines a repeated execution of the operation with the second operand over this dimension.

12. The method as recited in claim 1, wherein a plurality of first structures is provided; a plurality of second graphs being determined for first structures, which are found in the first graph; the plurality of first structures being sought in the plurality of second graphs.

13. The method as recited in claim 1, wherein instructions executable by the computing device are specified or determined or received; the pattern being determined as a function of the executable instructions.

14. The method as recited in claim 1, wherein a data structure for a node of the first graph is determined from a plurality of data structures for nodes of the first graph; the data structure including a data field, which defines an operation that is to be performed on other nodes; a data structure being determined for a node of the second graph having the same data structure; a data field that defines a node, on which the operation is to be performed, being replaced by a data field, in which another node, on which the operation is to be performed, is defined; either the other node being defined in another data field of the data structure for the node or the other node being defined in a data field of a data structure of a further node, to which a data field from the data structure of the node of the first graph refers.

15. The method as recited in claim 1, wherein a data structure for a node of the first graph is determined from a plurality of data structures for nodes of the first graph; the data structure including a data field, which defines a list including other nodes; a data structure being determined for a node of the second graph having the same data structure; the data field, which defines the list, being replaced by a data field, in which a first entry from the list and a second entry from the list are interchanged.

16. The method as recited in claim 1, wherein at least one node is determined which defines a program loop for determining a result; the at least one node being assigned a parameter, which characterizes a storage frame in the storage device; a first program loop and a second program loop being determined as a function of the parameter; the first program loop including at least one instruction for determining the result and one instruction for calling up the second program loop, by which a partial result for it may be determined.

17. A device comprises a processor configured to generate instructions for a computing device for executing a computational algorithm, the device configured to:

provide a directed, first graph having nodes and edges, which defines first instructions for the computing device for executing the computational algorithm;

search for at least one first part that has a first structure in the first graph;

determine a second part having a second structure as a function of the at least one first part;

determine a directed, second graph having nodes and segments as a function of the first graph;

replace the first part with the second part in the second graph, the second graph defining second instructions for the computing device for executing the computational algorithm;

provide a pattern for at least a part of a graph, whose nodes and edges are defined by instructions that are executable by the computing device; and generate the instructions for the computing device either as a function of the first graph or as a function of the second graph, the first graph or the second graph being selected as a function of the pattern, to generate the instructions for the computing device.

* * * * *